US012676377B2

(12) United States Patent (10) Patent No.: US 12,676,377 B2

Karlsson et al. (45) Date of Patent: Jul. 7, 2026

(54) STRUCTURAL BATTERY PACK CELL SIGNAL AND CONVERSION PASS-THROUGH

(71) Applicant: Volvo Car Corporation, Gothenburg (SE)

(72) Inventors: Daniel Karlsson, Gothenburg (SE); Martin Hjälm Wallborg, Gothenburg (SE); Klas Persson, Gothenburg (SE); Leopold Werberg, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 699 days.

(21) Appl. No.: 18/109,942

(22) Filed: Feb. 15, 2023

(65) Prior Publication Data

US 2023/0261304 A1 Aug. 17, 2023

(30) Foreign Application Priority Data

Feb. 17, 2022 (EP) .................................... 22157360

(51) Int. Cl.
H01M 50/249 (2021.01)
B60L 50/60 (2019.01)
H01M 10/42 (2006.01)

(52) U.S. Cl.
CPC .......... H01M 50/249 (2021.01); B60L 50/66 (2019.02); H01M 10/4257 (2013.01); H01M 2220/20 (2013.01)

(58) Field of Classification Search
CPC .......... H01M 50/249; H01M 10/4257; H01M 2220/20; B60L 50/66; B60K 1/04
See application file for complete search history.

(56) References Cited

U.S. PATENT DOCUMENTS

| 11,043,721 | B2 * | 6/2021 | Kataoka | |
| 11,764,431 | B2 * | 9/2023 | Anandarajah | ......... H01M 50/20 |
| | | | | 429/82 |
| 12,278,346 | B2 * | 4/2025 | Kuranuki | |
| 2011/0101920 | A1 * | 5/2011 | Seo | |
| 2013/0108894 | A1 * | 5/2013 | Jung | ................... H01M 10/425 |
| | | | | 429/7 |
| 2023/0032112 | A1 * | 2/2023 | Pokora | |

FOREIGN PATENT DOCUMENTS

| CN | 112490577 | A | * | 3/2021 | ............. B60L 50/64 |
| EP | 3926747 | A1 | | 12/2021 | |
| WO | WO-2021088570 | A1 | * | 5/2021 | ......... H01M 50/367 |

OTHER PUBLICATIONS

Aug. 3, 2022 European Search Report issued in corresponding International Application No. 22157360.

* cited by examiner

*Primary Examiner* — James A Shriver, II
*Assistant Examiner* — Nicholas R. Kandas
(74) *Attorney, Agent, or Firm* — Clements Bernard Walker; Christopher L. Bernard

(57) ABSTRACT

A battery pack for use in an electric vehicle having two longitudinal sill members extending in a length direction, interconnected at a front side by front and rear transverse members, a number of rectangular battery cells being placed between the sill members, the front transverse member and the rear transverse member, the cells being mutually adjacent in the length direction. The battery pack has at least a chamber integrated in the rear transverse beam, said chamber being configured to accommodate an analog-to-digital converter.

15 Claims, 6 Drawing Sheets

STRUCTURAL BATTERY PACK CELL SIGNAL AND CONVERSION PASS-THROUGH

CROSS-REFERENCE TO RELATED APPLICATION

The disclosure claims the benefit of priority of co-pending European Patent Application No. 22 157 360.3, filed on Feb. 17, 2022, and entitled "Structural Battery Pack Cell Signal and Conversion Pass-Through," the contents of which are incorporate in full by reference herein.

TECHNICAL FIELD

The disclosure relates to a battery pack for use in an electric vehicle having two longitudinal sill members extending in a length direction, interconnected at a front side by a front transverse member and at a distance from the front transverse member by a rear transverse member, the front transverse member and the rear transverse member extending in a width direction, a number of rectangular battery cells being placed between the sill members, the front transverse member and the rear transverse member, the cells being mutually adjacent in the length direction. The disclosure also relates to an electric vehicle including such a battery pack.

BACKGROUND

Electrical vehicles (also known as Battery Electric Vehicles, BEVs in short) use a battery pack to provide electricity to the drive train/motor(s) that is most often located centrally underneath a body-in-white structure. Until recently, a battery pack has been seen as a standalone unit with main function of being a protective cage around battery cells and modules preventing intrusion in case of an accident, while protecting sensitive electronics inside from the outside environment. Going further into the battery pack design, battery cells and modules have been treated as sub-systems, carrying their own separate mechanical structures such as module end plates and straps. Zooming out, one can see opportunities for improvement if the systems barriers are broken down and the ingoing parts are integrated to form larger units, working as a whole—one system.

From a bottom-up-approach; cells integrate to form a strong pack with high volumetric efficiency; a battery pack used as a structural component and leveraged as such when installed to a body-in-white. Such a design is able to remove redundant structures, increase cell volume and reduce complete vehicle weight, all while improving on range, crashworthiness and driver experience by providing a lighter, nimbler vehicle due to a lowered polar moment of inertia, as the cells are packed closer to vehicle center of gravity.

This in turn requires development of new types of passthough and routing options to carry signals from the cell bay into the BDU (Battery Disconnect Unit), as traditional routing options are cut off in order to increase pack energy density and structural performance.

Commonly, multiple conversion units are placed strategically and carefully inside a battery pack as to minimize the loss of cell volume (range), safeguard crashworthiness, design for redundancy or serviceability depending on overall strategy and business case, and to cut down on wiring length.

It is an object to provide a battery pack allowing passthrough and conversion all while using the minimum amount of volume to do so. It may be a further object to provide a battery pack allowing pass-through and conversion all while withstanding cell swelling (due to ageing). It is another object to provide an electric vehicle having a structural battery that allows pass-through and conversion functionality while keeping enough beam integrity to sufficiently withstand swell forces generated by cell ageing.

SUMMARY

A battery pack for use in an electric vehicle according to the disclosure includes two longitudinal sill members extending in a length direction, interconnected at a front end by a front transverse member and interconnected at a rear end, at a distance from the front transverse member, by a rear transverse member. The front transverse member and the rear transverse member extend in a width direction. A number of rectangular battery cells are placed between the sill members, the front transverse member and the rear transverse member, the cells being mutually adjacent in the length direction.

The rear transverse beam has an inward side contacting the battery cells, e.g. glued or by other means connected, and an outward side facing away from the battery cells. The rear transverse beam has in a depth direction D oppositely faced up- and downward sides. The battery pack has at least a chamber integrated in the rear transverse beam, said chamber being configured to accommodate an analog-to-digital converter. By integrating the converter into the rear end beam, the conversion and signal lines can be effectively accommodated.

The battery pack according to the disclosure utilizes a section of a battery structural member to integrate the pass-through and conversion functionality of one or multiple analog cells measurement signals (from e.g. a FlexPCB) into a digital signal. This allows pass-through and conversion functionality while keeping enough beam integrity to sufficiently withstand swell forces generated by cell ageing. The improved volumetric efficiency that is achieved by the battery pack according to the disclosure can be used to make the pack more narrow and in extension save weight by creating a longer stopping distance.

The chamber may define a passage through the rear transverse beam extending from the upward side to the downward side, wherein the chamber opens onto the exterior of the rear transverse beam through an upward opening in the upward side and through a downward opening in the downward side.

The battery cells may be bonded in a non-destructive inseparable manner, e.g. glued, to each other. The battery cells may further be bonded in a non-destructive inseparable manner, e.g. glued, to the frame which surrounds them, for example the sill members and the transverse members. Since the surrounding parts are in inseparable contact with the battery, the space on the battery cell side for routing of power lines and data lines is effectively closed off. By integrating the converter into the rear end beam, the conversion and signal lines can be effectively accommodated.

The battery cells may be bonded in a non-destructive inseparable manner, e.g. glued, to parts provided underneath the battery cells. For example, the signal lines running underneath and/or a bottom lid may be bonded in a non-destructive inseparable manner to the battery cells. Since the surrounding parts are in inseparable contact with the battery, the space for servicing the battery cell from those sides is closed off. By integrating the converter into the rear end beam, it is still serviceable with access from above.

The battery pack may include an analog-to-digital converter cassette (ADC) provided in the chamber, the ADC configured to convert an analog signal corresponding to an output of the battery cells into a digital signal.

The ADC cassette may include an analog input connection communicatively connected with the battery cells, for example via at least one flexible PCB extending in the length direction L or a flexible flat cable (FFC) extending in the length direction L. The analog input connection may be formed complementary with a pin connector of the flexible PCB/cable. Although the pin connector is permanently installed to a non-serviceable part of a battery pack, the latter design allows for easy attachment or detachment of the ADC cassette. The ADC cassette may be pressed down and installed to the connector pin.

The ADC cassette may include a digital output connection communicatively connected with a battery management system (BMS) or a part thereof, e.g. a battery disconnect unit (BDU). In the context of this disclosure, a BMS is considered as a safety control system required for managing individual cells of the battery pack and an entire battery pack. This design allows for digital signal cables to be only provide on a BDU-side, i.e. upper side, to enable more efficient use of the available volume. The BDU may be provided in close proximity to the rear transverse beam and hence the ADC cassette. This allows to minimize harness length and optimize for weight and cost.

The battery pack according to the present disclosure further allows to place cables and other electric connections carrying analog signals adjacent to the battery cells, i.e. within a volume being created by the two spaced-apart longitudinal sill members, the front transverse member and the rear transverse member. Additionally or alternatively, cables and other electric connections carrying analog signals may be placed in the chamber. This has the effect that electromagnetic interferences originating from the analog signals of these cables or electric connections are shielded by at least one of the two spaced-apart longitudinal sill members, the front transverse member and the rear transverse member. Thus, only comparatively low electromagnetic interferences result from the battery pack. Due to the fact that an analog-to-digital converter may be placed in the chamber, a configuration can be achieved, wherein outside the volume delimited by the two spaced-apart longitudinal sill members, the front transverse member and the rear transverse member and outside the chamber, only cables and other electric connections carrying digital signals are present. Consequently, the battery pack has a comparatively high electromagnetic compatibility, i.e. little or no disturbing signals result from the battery pack.

The ADC cassette may have an upper connection end and a lower connection end facing away from each other in the depth direction D. The analog input connection may be provided at the lower connection end of the ADC and the digital output connection may be provided at the upper connection end of the ADC. Alternatively, the analog input connection may be provided at the upper connection end of the ADC and the digital output connection may be provided at the lower connection end of the ADC. Furthermore, the ADC cassette may include a flange extending at the upper connection end being complementary with a recessed opening in the upward side of the transverse beam. Allowing the ADC cassette to be bolted in-place to secure durability and long term connection.

In an example, the analog-to-digital converter cassette, ADC, is sealed with respect to the rear transverse beam using a sealing means. In other words, the opening in the upward side of the rear transverse beam is sealed using the analog-to-digital converter cassette, ADC, and the sealing means. Thus, the battery pack, especially the volume including the battery cells, is sealed with respect to an exterior of the battery pack, especially a location of the battery management system, BMS. Consequently, gases and/or liquids cannot travel from an exterior of the battery pack into the battery pack and vice versa. This enhances operational reliability of the battery pack.

The battery pack may include two or more rows of battery cells being placed side by side in the width direction W. A plurality of adjacent chambers may further be integrated in the rear transverse beam, wherein for each chamber corresponds to a row of battery cells, said chambers being configured to accommodate analog-to-digital converters.

The battery pack may include a cover to protect the chamber at the upward side of the rear transverse beam and optionally the BDU. This further allows easy access and service opportunity of the ADC from the BDU-side. When a plurality of chambers are integrated in the rear transverse beam, a common cover may be provided.

When a plurality of chambers are integrated in the rear transverse beam, and each one of the plurality of chambers includes an ADC cassette, each cassette may be communicatively connected to separate connections means, such as flexible PCBs or FFCs, extending in the length direction L corresponding to one or more different rows of battery cells. The connections means may extend from the rear transverse member to the front transverse member to reach all cells in between the front and rear transverse members.

The battery pack may improve volumetric efficiency by compressing the cells that are mutually adjacent, forming a stack between the front and rear transverse beams, without further internal support components between the cells. The front transverse member and the rear transverse member may exert a compressive force of between 20 and 200 kN/m² on the cells in the length direction.

The prismatic battery cells require a pre-compressive force at beginning of life (BOL) when installed to either a module or cell-to-pack solution. This is due to their rectangular format. The front transverse beam and the rear transverse member interconnect the sill members and serve the dual purpose of being compressive end plates while providing a mechanical interface for integrating the pack to the electric vehicle.

An embodiment of a battery pack includes compression members situated between battery cells that are adjacent in the length direction L. The compression members may be included between each pair of adjacent battery cells in the length direction or can be placed between only some adjacent cells, and maintain a resilient compression on the cells in the length direction. The compression members may include a rubber frame with an aerogel compound inside the frame. The rubber is compressible and suitable for reaching an initial compressive force. The aerogel acts as a thermal barrier, preventing thermal runaway. Alternatively, the compression members include a polymer foam pad or frame. Another option for a compression member is a fibrous material pad.

The longitudinal sides of the outer battery cells may be situated close to the longitudinal sill members or may be abutting against the sill members to provide a structural support to the sill members in the width direction. In the latter case, the cells are used as a back-up structure. Alternatively, there may be a distance between the cells and the sill members in the width direction of between 5 cm and 25 cm, depending on the side impact principle used. A gap would translate into not using cells as back-up structure. In such a case, the external battery structure is allowed to collapse inwards to a specific point where a side pole is stopped before there is severe cell intrusion. The main load is carried by a body-in-white-section (ie. rockers and rocker reinforcements) together with lateral cross members on top of the battery, and some portion in the battery sill member itself. The latter design, featuring a battery-internal air gap, allows for routing depending on the specific need; for example, an internal cooling system could be accommodated.

In an embodiment of a battery pack, the front transverse beam includes a transverse part having a height substantially corresponding with the height of the battery cells, and a shelve part extending in the length direction, away from the cells, in an upper plane at or near an upper plane defined by the top sides of the battery cells.

The front transverse beam and transverse part provide a compressive force on the battery cells while providing a stiff connection of the battery pack to the front and rear sub frames of the electric vehicle via the shelf parts.

The battery pack may in one embodiment include two further transverse beams interconnected by a bottom plate, at a distance from the rear end of the sill members, defining a foot accommodation space. This construction is especially suited for making a sedan with very low foot positions.

In another embodiment, the front transverse beam and/or rear transverse beam have a thickness extending in the length direction and have an inward side contacting the battery cells and an outward side facing away from the battery cells, one or more passages with electrical conductors extending through the front transverse beam and/or rear transverse beam, from the inward side to the outward side.

BRIEF DESCRIPTION OF THE DRAWINGS

Some embodiments of a structural battery and method of manufacture will, by way of non-limiting example, be explained in detail with reference to the accompanying drawings. In the drawings.

DESCRIPTION OF EMBODIMENTS

Figure 1:
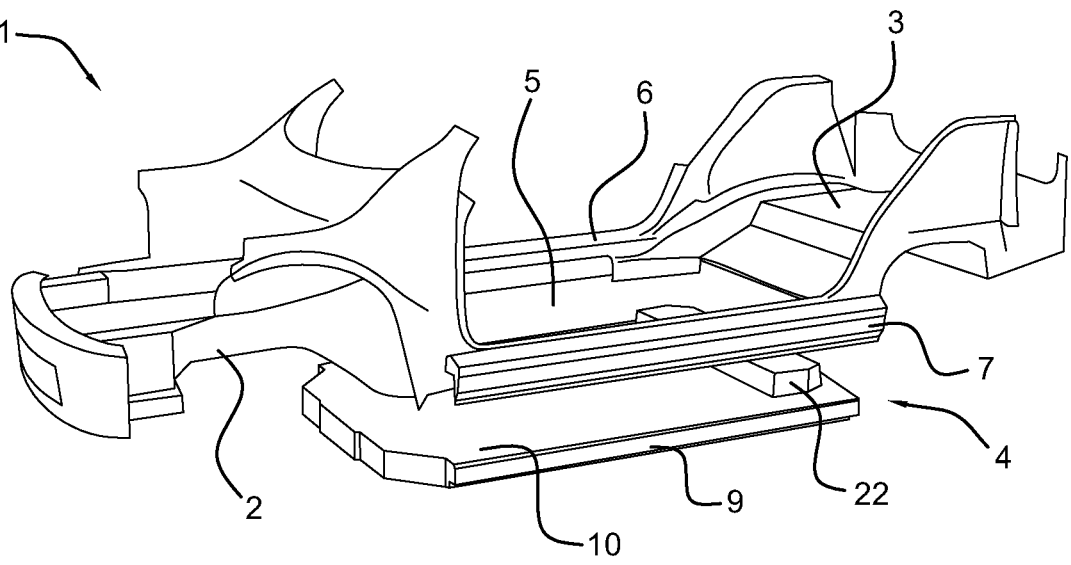
FIG. 1 shows a structural battery assembly according to the disclosure connected to a front and rear frame part of an electric vehicle.

FIG. 1 shows a frame 1 of an electric vehicle, including a front frame structure 2, a rear frame structure 3, including a rear floor, and a structural battery assembly 4 forming a bottom structure 5 of the vehicle. The structural battery assembly, or pack, 4 includes longitudinal sill profiles 6,7 that interconnect the front and rear frame structures 2,3 and that support a number of rows of interconnected battery cells 9. The top plate 10 of the battery pack 4 forms the bottom of the cabin of the vehicle.

Figure 2:
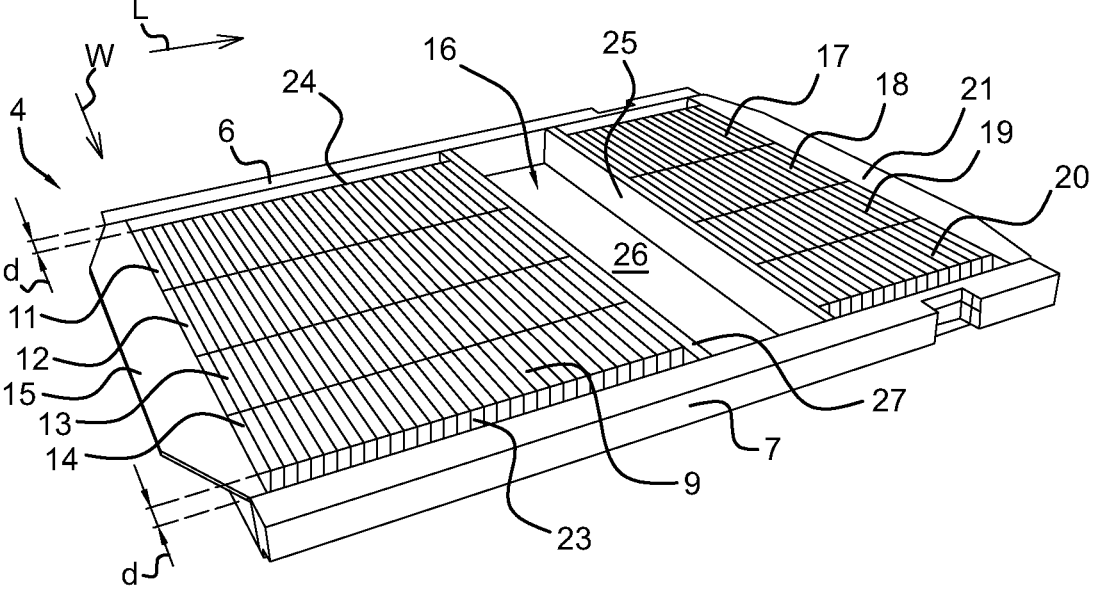
FIG. 2 shows a perspective view of a structural battery assembly with a foot garage.

FIG. 2 shows the stack of battery cells 9 that in the front part of the battery pack 4 are arranged in four rows 11,12, 13,14. The battery cells 9 are stacked in the length direction L between a front transverse beam 15 and a foot garage 16. The front transverse beam 15, the rear transverse beam 21 and the foot garage 16 are welded to the sill profiles 6,7.

In the rear part of the battery pack 4, rows of cells 17,18,19,20 are placed between the foot garage 16 and a rear transverse beam 21. The cells 9 in each row 11-14 and rows 17-20 are mutually adjacent and may include swell pads between the cells. The rows of cells 11-14 are compressed in the length direction L between front transverse beam 15 and the foot garage 16. The rows of cells 17-20 are compressed between the foot garage and the rear transverse beam 21. The compression members are formed of a resilient material. The pre-compression on the cells in the length direction L may be between 20-200 $kN/m^2$.

Along the longitudinal sides 23, 24 of the cells 9 and the sill profiles 6,7 a distance d of between 5-25 cm may be present in the width direction W to increase the stopping distance from the cells upon side impact, which allows a weight reduction of the cells 9.

FIGS. 3-8 shows a plurality of analog-to-digital converter cassettes 31, 31' integrated in respective cassette chambers 41, 41' in the rear transverse beam 21. The cassette chamber 41 extends between the inner and outer walls 28,30 with a width z in the length direction L and between the upper and lower walls 52, 54 with a height h in the depth direction D. The width z is limited by the printed circuit board (PCB) design inside the ADC. For example, the width z may range from 15 to 20 mm. The analog-to-digital converter cassette 31 is bolted to a recessed opening 53 of the rear transverse beam 21 via a flange 55 and bolts 49. The analog-to-digital converter extends between an upper and a lower connection end 50,51 respectively provided with a digital output and analog input connection 48, 33. The analog input connection 33 is connected to the lower connection end 51 via pin collector 32 and connects the ADC cassette 31 to a row of battery cells 9 via a flexible PCB.

Figure 7:
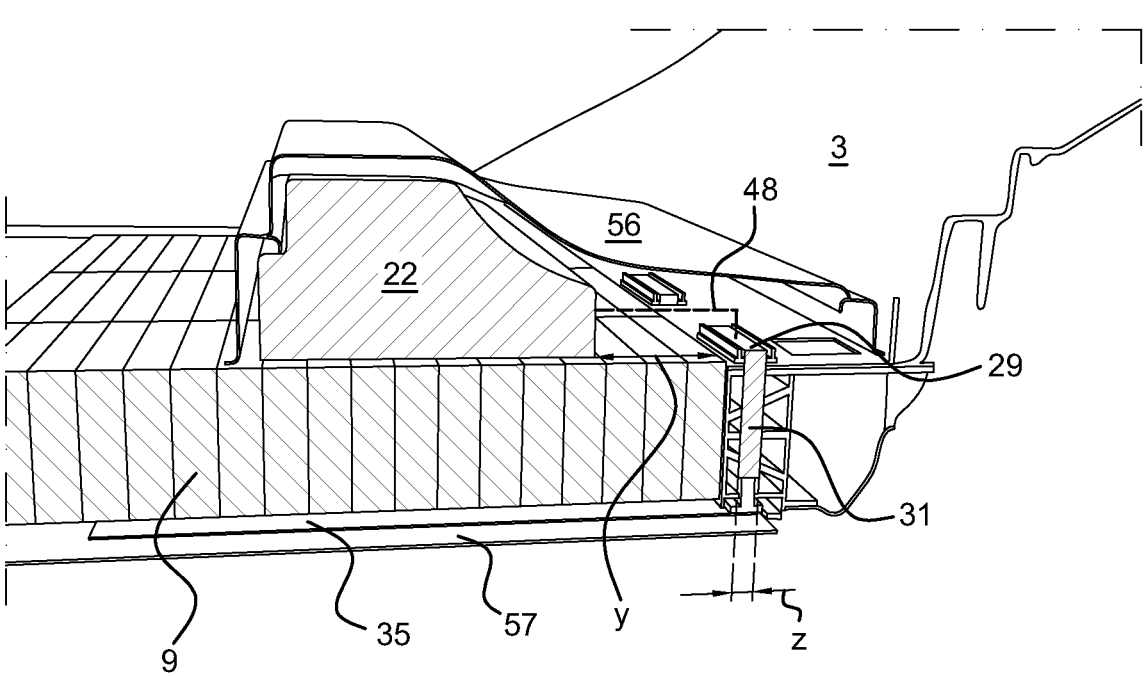
FIG. 7 schematically shows a structural battery assembly provided in an electric vehicle and connected to a rear frame part of an electric vehicle.
Figure 8:
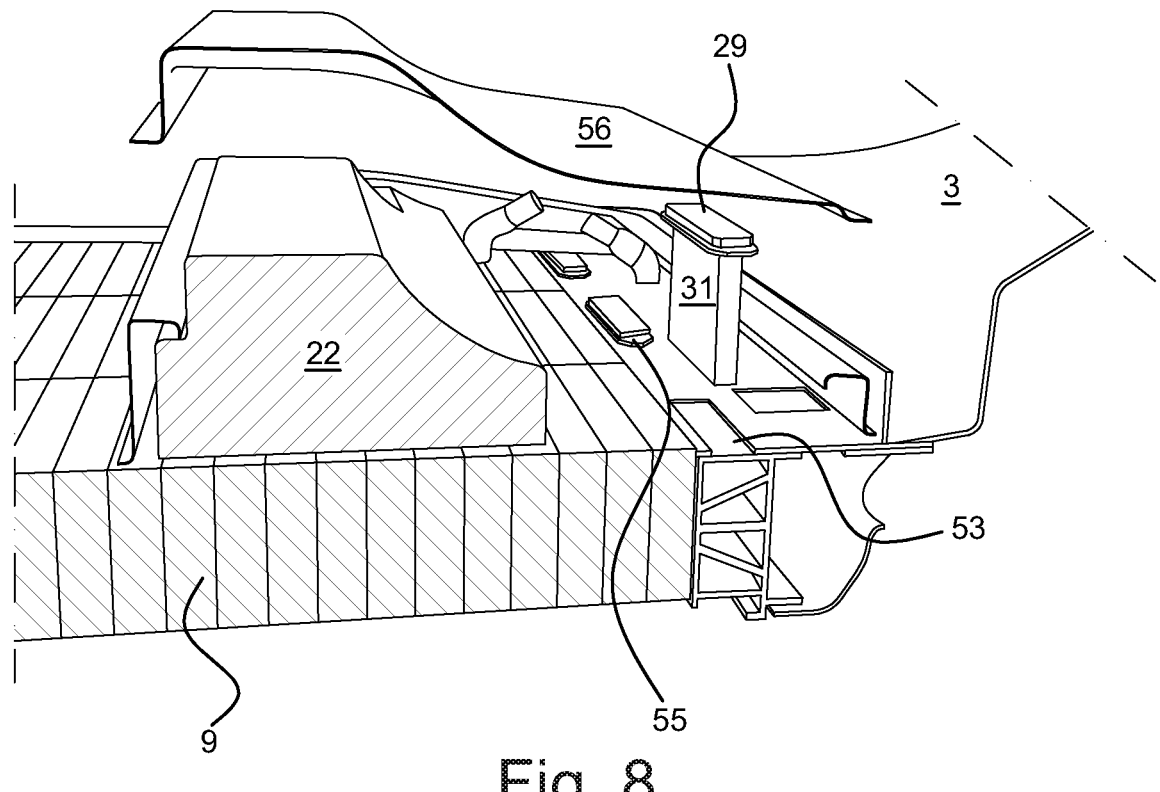
FIG. 8 schematically shows a partially exploded view of the structural battery assembly shown in FIG. 7.

As shown in FIG. 7, the digital output and analog input connection 48 of the ADC cassette 31 is connectable to battery disconnect unit 22 provide at a distance y from the rear transverse beam 21 in the length direction L. The position of the battery disconnect unit 22 follows the position of the rear seat (not shown) and as such depends on the mechanical integration of the vehicle interior. For example, the distance y may range from 5 to 20 cm.

Furthermore, sealing means 58 are interposed between the flange 55 of each of the analog-to-digital converter cassettes, ADCs, and the upward side of the rear transverse beam 21. Thus, the battery pack 4, especially the volume including the battery cells 9, is sealed with respect to an exterior of the battery pack 4, especially a location of the battery management system, BMS.

This has the effect that gases that may be generated by the battery cells 9 in a gassing event do not reach the exterior of the battery pack 4 and especially not the battery management system, BMS, and other electric systems connected thereto. Since gases being generated by the battery cells 9 may include electrically conductive particles, the fact that the sealing means 58 is provided reduces or eliminates the risk of undesired arcing in the battery management system, BMS, or its surroundings.

A further effect relates to the fact that, due to the sealing means 58, liquids cannot enter the chamber 31 and, via the chamber 31, the battery cells 9 in an undesired manner. This is relevant if the battery management system, BMS, or other electronic components outside the battery pack 4 are water-cooled since water-cooling always bears the risk of an undesired leakage. In such a situation, the battery cells 9 and the analog-to-digital converter cassettes, ADCs, are well protected against water.

Figures 3, 4:
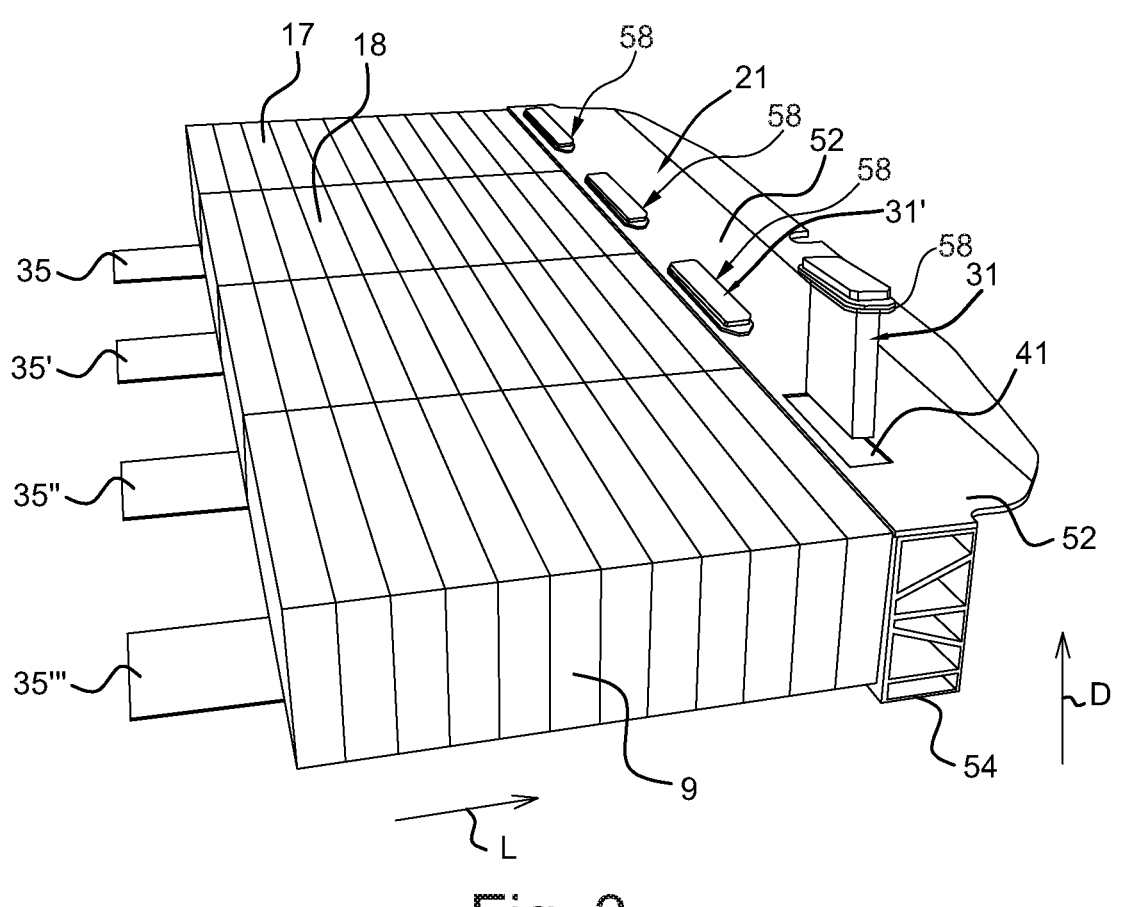
FIGS. 3-5 show different perspective views of a rear part of a structural battery assembly.
Figure 5:
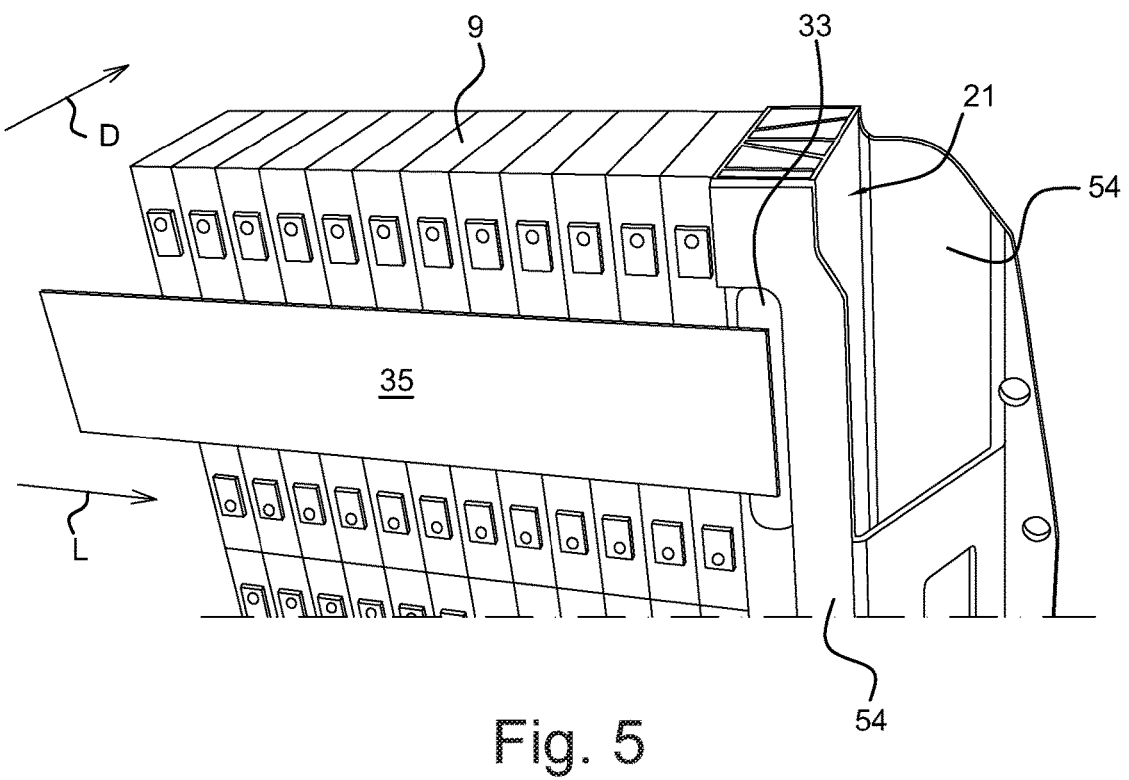
Figure 6:
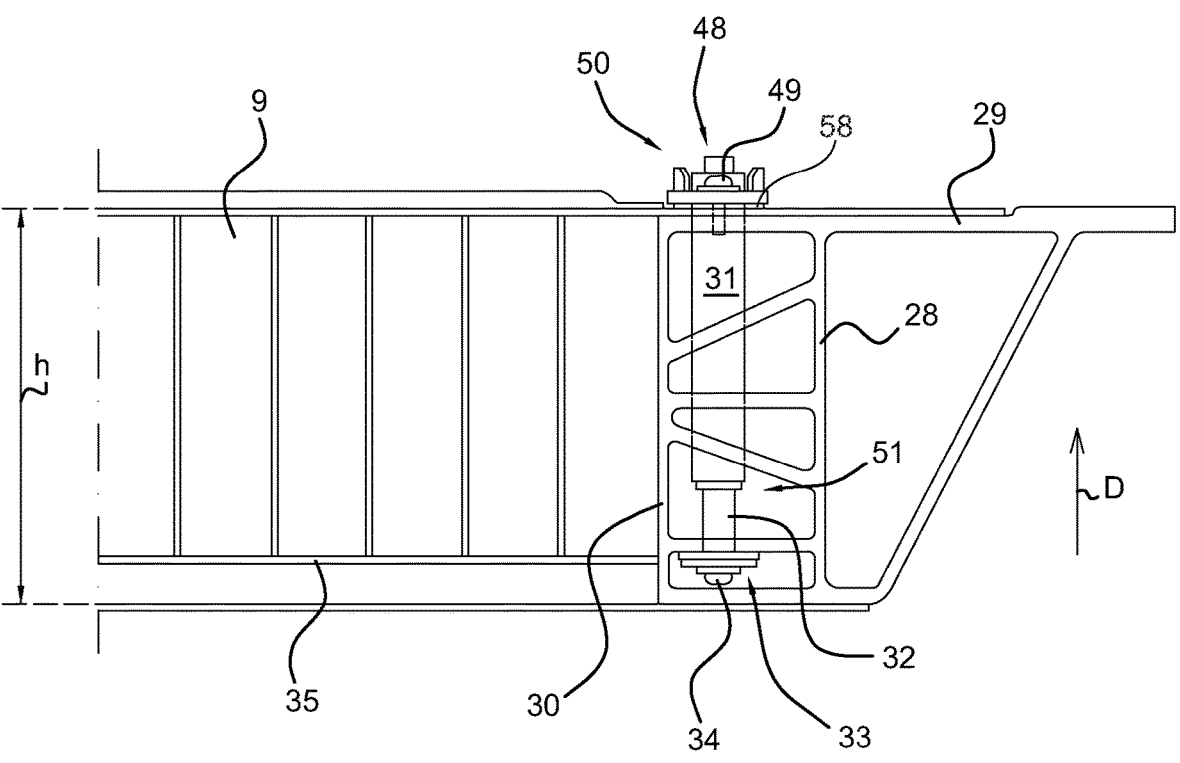
FIG. 6 shows a side view of the structural battery assembly shown in FIGS. 3-5.

It is understood that the sealing means 38 do not necessarily need to be placed in the locations as shown in FIGS. 3, 4 and 6. It is also possible to place the sealing means 38 in other appropriate locations.

Figure 9:
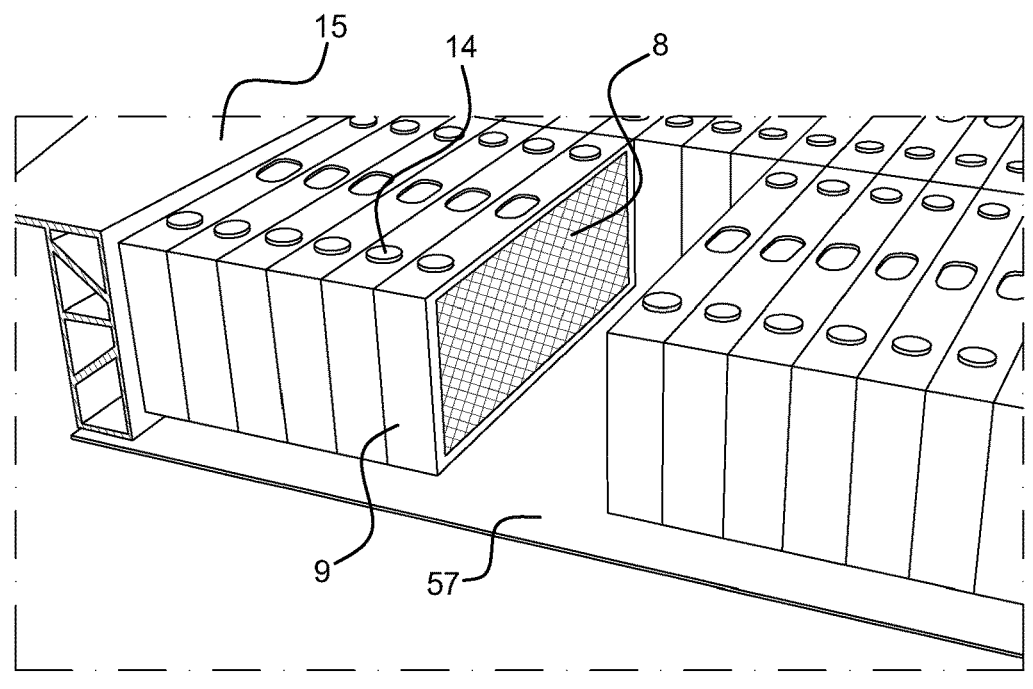
FIG. 9 shows a frame-shaped swell pad positioned on the side surfaces of the battery cells.

FIG. 9 shows a resilient compression member 8 placed on the side surface of battery cell 9. The compression member is formed of a rectangular frame of a resilient material, such as a rubber rod or tube. An aerogel compound with fire retardant properties may be included within the rubber tube.

Figure 10:
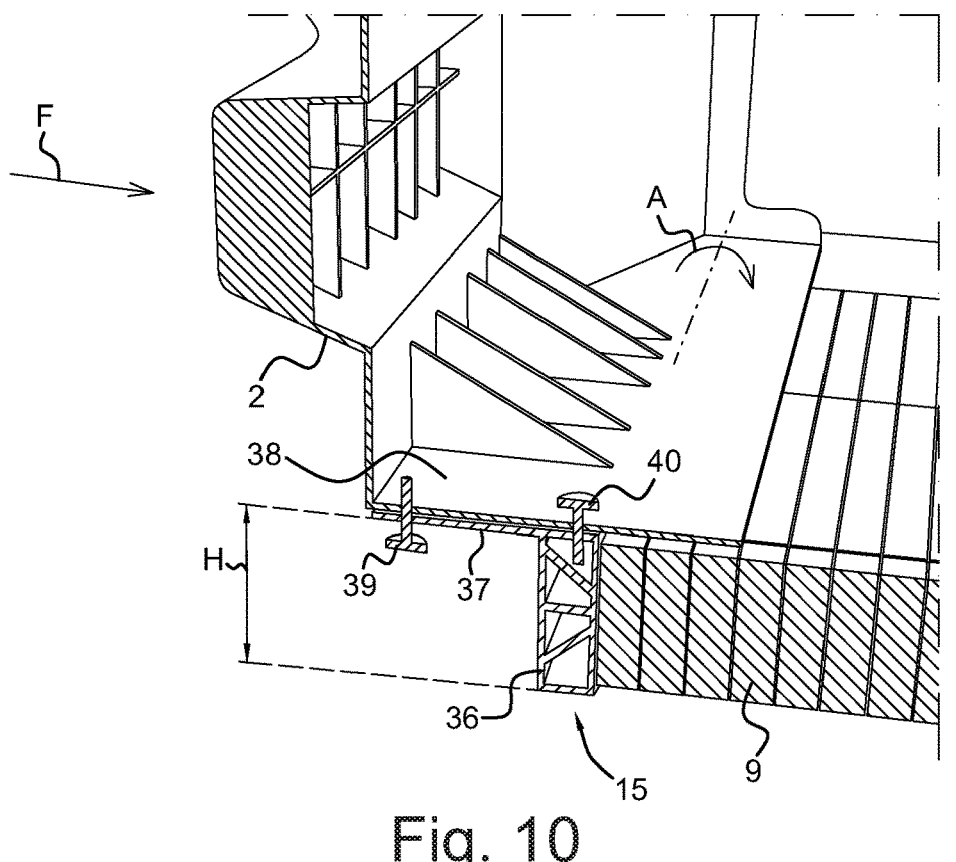
FIG. 10 shows a longitudinal cross-sectional view of a front part of the structural battery assembly and its connection to a front frame part.

FIG. 10 shows the front transverse beam 15 with a transverse beam part 36 and a shelve part 37. The shelve part 37 connects to a plate 38 of the front frame structure 2 via bolts 39, 40. The plate 38 extends in the length direction L over the battery cells 9 to provide an increased torsional stiffness in the direction of the arrow A upon exertion of a force F generated by a frontal impact.

Figure 11:
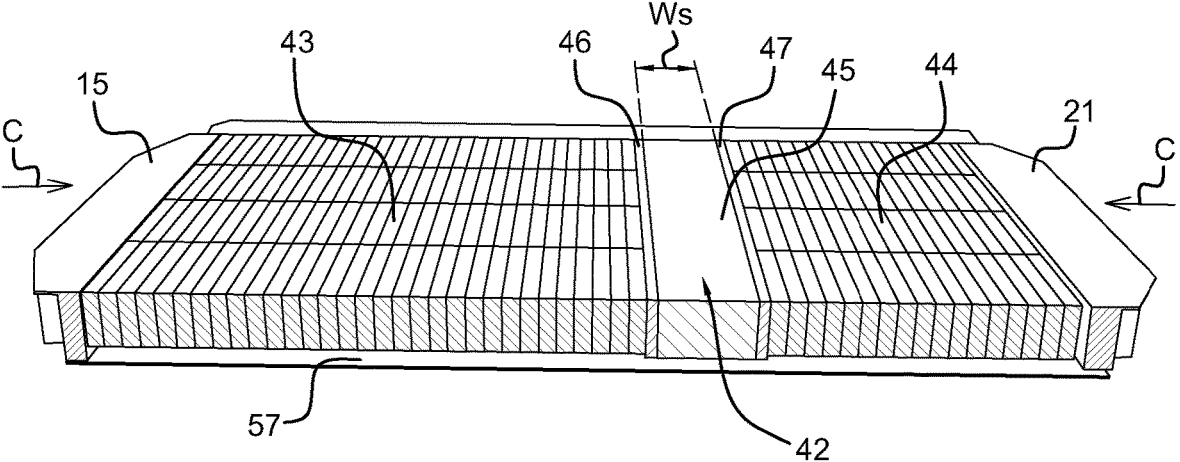
FIG. 11 shows a side view of an embodiment of a structural battery assembly including a resilient scaling member with one sill member removed.

FIG. 11 shows a scaling member 42 included in the compressed stack between a forward group of battery cells 43 and a rearward group of battery cells 44. The scaling member 42 formed of a central beam 45 of EPP, (expanded polypropylene), or EPP foam, flanked by two aluminum profiles 46, 47. The scaling member 42 is adjusted in width Ws (seen in the length direction L) depending on the wheel base of the vehicle. The scaling member 42 acts as a "filler" to remove cell stack void, and have the battery cells 42, 43 engage in compressive contact with the front and rear beams 15, 21. The scaling member 42 allows the use of a fixed battery cell format to completely fill a battery pack on several different wheelbases, with and without the presence of foot garage, and with different numbers of battery cells to reach different levels of energy (e.g. 144, 168 and 192 of cells).

Although the disclosure is illustrated and described with reference to illustrative embodiments and specific examples, it will be readily apparent to those of ordinary skill in the art that other embodiments and examples may perform similar functions and/or achieve like results. All such equivalent embodiments and examples are within the spirit and scope of the disclosure, are contemplated thereby, and are intended to be covered by the following non-limiting claims for all purposes.

The invention claimed is:

1. A battery pack for use in an electric vehicle, the battery pack comprising:

two spaced-apart longitudinal sill members extending in a length direction L, interconnected at front portions thereof by a front transverse member and interconnected at a rear portions thereof by a rear transverse member, said front transverse member and rear transverse member extending in a width direction W, and a number of battery cells being placed between the sill members, the front transverse member and the rear transverse member, said cells being mutually adjacent in the length direction L, the rear transverse beam having an inward side contacting the battery cells and an outward side facing away from the battery cells, the rear transverse beam having opposite upward and downward sides that are spaced apart in a depth direction D, and the battery pack having at least a chamber integrated in the rear transverse beam, said chamber being configured to receive an analog-to-digital converter through the upward side of the rear transverse beam with a flange of the analog-to-digital converter contacting the upward side of the rear transverse beam.

2. The battery pack according to claim 1, the chamber defining a passage through the rear transverse beam extending from the upward side to the downward side, and the chamber opening onto the exterior of the rear transverse beam through an upward opening in the upward side and through a downward opening in the downward side.

3. The battery pack according to claim 1, said battery cells being bonded to each other and to each one of the sill members and the transverse members.

4. The battery pack according to claim 3, the battery cells being further bonded to a cover plate provided underneath the battery cells.

5. The battery pack according to claim 1, further comprising an analog-to-digital converter (ADC) cassette provided in the chamber, the ADC configured to convert an analog signal corresponding to an output of the battery cells into a digital signal and configured to balance the voltage of the battery cells.

6. The battery pack according to claim 5, the ADC having an analog input connection connected with the battery cells and a digital output connection connected to a battery management system (BMS) of the battery pack.

7. The battery pack according to claim 6, said ADC having an upper connection end and a lower connection end spaced apart in the depth direction D, the analog input connection being provided at the lower connection end of the ADC and the digital output connection is provided at the upper connection end of the ADC.

8. The battery pack according to claim 6, the analog input connection being connected with the battery cells via at least one of a flexible PCB extending in the length direction L, a flexible flat cable (FFC) and another signal cable.

9. The battery pack according to claim 8, the battery cells being further bonded to the at least one of the flexible PCB extending in the length direction L, the FFC, and the other signal cable.

10. The battery pack according to claim 1, the chamber being closed at the upward side of the rear transverse beam by a removable cover.

11. The battery pack according to claim 1, comprising two or more rows of battery cells being placed side by side in a width direction W, and a plurality of adjacent chambers being integrated in the rear transverse beam, each chamber corresponding to a row of battery cells, said chambers being configured to accommodate analog-to-digital converters (ADCs).

12. The battery pack according to claim 11, the plurality of chambers being closed by a common cover.

13. The battery pack according to claim 11, each one of the plurality of chambers comprising an analog-to-digital converter (ADC) cassette connected with the battery cells via separate connections means extending in the length direction L from the rear transverse member to the front transverse member, wherein each connection means corresponds to different rows of battery cells.

14. The battery pack according to claim 1, the front transverse member and the rear transverse member arranged to exert a compressive force of between 20 and 200 kN/m2 on the cells in the length direction L based on a length of the interconnecting sill members in the length direction L as compared to a length of the cells in the length direction L.

15. An electric vehicle, comprising:

a battery pack, comprising:

two spaced-apart longitudinal sill members extending in a length direction L, interconnected at front portions thereof by a front transverse member and interconnected at a rear portions thereof by a rear transverse member, said front transverse member and rear transverse member extending in a width direction W, and a number of battery cells being placed between the sill members, the front transverse member and the rear transverse member, said cells being mutually adjacent in the length direction L, the rear transverse beam having an inward side contacting the battery cells and an outward side facing away from the battery cells, the rear transverse beam having opposite upward and downward sides that are spaced apart in a depth direction D, and the battery pack having at least a chamber integrated in the rear transverse beam, said chamber being configured to receive an analog-to-digital converter through the upward side of the rear transverse beam with a flange of the analog-to-digital converter contacting the upward side of the rear transverse beam.

* * * * *